US009646076B2

(12) United States Patent
Barkai et al.

(10) Patent No.: US 9,646,076 B2
(45) Date of Patent: May 9, 2017

(54) SYSTEM AND METHOD FOR ESTIMATING GROUP EXPERTISE

(71) Applicant: International Business Machines Corporation, Armonk, NY (US)

(72) Inventors: Gilad Barkai, Haifa (IL); Shai Erera, Kiryat Ata (IL); Ido Guy, Haifa (IL)

(73) Assignee: International Business Machines Corporation, Armonk, NY (US)

(*) Notice: Subject to any disclaimer, the term of this patent is extended or adjusted under 35 U.S.C. 154(b) by 138 days.

(21) Appl. No.: 14/275,894

(22) Filed: May 13, 2014

(65) Prior Publication Data

US 2015/0331862 A1 Nov. 19, 2015

(51) Int. Cl.
*G06F 17/30* (2006.01)

(52) U.S. Cl.
CPC ...... *G06F 17/3061* (2013.01); *G06F 17/3053* (2013.01); *G06F 17/30867* (2013.01)

(58) Field of Classification Search
CPC .................................................... G06N 5/022
USPC .............................. 707/754, 752, 758; 706/50
See application file for complete search history.

(56) References Cited

U.S. PATENT DOCUMENTS

| | | | | |
|---|---|---|---|---|
| 5,963,940 A * | 10/1999 | Liddy | ............... | G06F 17/30654 |
| 6,026,388 A * | 2/2000 | Liddy | ............... | G06F 17/30654 |
| 7,444,315 B2 * | 10/2008 | Wu | ........................ | G06N 5/022 706/50 |
| 8,285,702 B2 | 10/2012 | Carmel et al. | | |
| 2007/0016563 A1 * | 1/2007 | Omoigui | ............. | G06F 17/3061 |
| 2007/0067293 A1 * | 3/2007 | Yu | ....................... | G06F 17/30687 |
| 2008/0120129 A1 * | 5/2008 | Seubert | .................. | G06Q 10/06 705/35 |
| 2010/0031358 A1 * | 2/2010 | Elovici | ............... | H04L 12/2602 726/24 |
| 2011/0119277 A1 | 5/2011 | Sotos | | |
| 2012/0143862 A1 | 6/2012 | Jones | | |
| 2012/0191716 A1 * | 7/2012 | Omoigui | ............. | H01L 27/1463 707/740 |
| 2015/0017616 A1 * | 1/2015 | Rachitsky | ............. | H04W 4/206 434/130 |
| 2015/0331862 A1 * | 11/2015 | Barkai | ................ | G06F 17/3061 707/728 |

OTHER PUBLICATIONS

Guy et al., "Mining Expertise and Interests from Social Media", WWW '13, Proceedings of the 22nd international conference on World Wide Web, 2013, pp. 515-526.

Woolley et al., "Evidence for a collective intelligence factor in the performance of human groups", Science magazine, vol. 330, published Oct. 29, 2010, pp. 686-688.

(Continued)

*Primary Examiner* — Baoquoc N To
(74) *Attorney, Agent, or Firm* — Zio Glazberg

(57) ABSTRACT

A method, apparatus and computer program product for estimating group expertise, the method comprising: executing a query against a knowledge base to retrieve at least one document; retrieving at least one entity associated with the at least one document; assigning at least one relevancy score to the at least one entity; obtaining a filtered list by filtering the at least one entity to contain only entities appearing in a predetermined collection; and assessing findability of the query based on the at least one entity and the relevancy score.

15 Claims, 3 Drawing Sheets

(56) References Cited

OTHER PUBLICATIONS

Carmel et al., "What makes a query difficult?", SIGIR '06 Proceedings of the 29th annual international ACM SIGIR conference on Research and development in information retrieval, pp. 390-397, 2006.

\* cited by examiner

SYSTEM AND METHOD FOR ESTIMATING GROUP EXPERTISE

TECHNICAL FIELD

The present disclosure relates to estimating the expertise level of a group regarding a particular subject.

BACKGROUND

Constructing a professional group is a keystone of any task in any area, whether the task relates to research, development, design, manufacturing, marketing or any other discipline. Complex tasks generally require more than one professional, wherein different people may be required to present expertise in different areas or aspects of the subject. The collective expertise of the group participants has to cover all required aspects of the task in which expertise is required.

Prior art documents mainly relate to searching for an individual expert in a particular subject. However, locating a group of experts that can address a problem is a challenging problem, having potentially high value but also high risk to the organization executing the task.

Even once a group of professionals is suggested, it may be required to assess the expertise level of the group, in order to determine whether the group is adequate for the task. Further, it may be required to assess the effect of additional recruiting or of departure of one or more group members. Expertise determination may apply to an individual, a team or even a company as a whole, in order to determine the extent of the company expertise in the subject.

BRIEF SUMMARY

One exemplary embodiment of the disclosed subject matter is a computer-implemented method comprising: executing a query against a knowledge base to retrieve one or more documents; retrieving one or more entities associated with an of the documents; assigning one or more relevancy score to any of the entities; obtaining a filtered list by filtering the entities to contain only entities appearing in a predetermined collection; and assessing findability of the query based on the entities and the relevancy score.

Another exemplary embodiment of the disclosed subject matter is a computerized apparatus having a processor, the processor being adapted to perform the steps of: executing a query against a knowledge base to retrieve one or more documents; retrieving one or more entities associated with the any of the documents; assigning one or more relevancy scores to any of the entities; obtaining a filtered list by filtering the entities to contain only entities appearing in a predetermined collection; and assessing findability of the query based on the entities and the relevancy score.

Yet another exemplary embodiment of the disclosed subject matter is a computer program product comprising a computer readable storage medium retaining program instructions, which program instructions when read by a processor, cause the processor to perform a method comprising: executing a query against a knowledge base to retrieve one or more documents; retrieving one or more entities associated with an of the documents; assigning one or more relevancy score to any of the entities; obtaining a filtered list by filtering the entities to contain only entities appearing in a predetermined collection; and assessing findability of the query based on the entities and the relevancy score.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
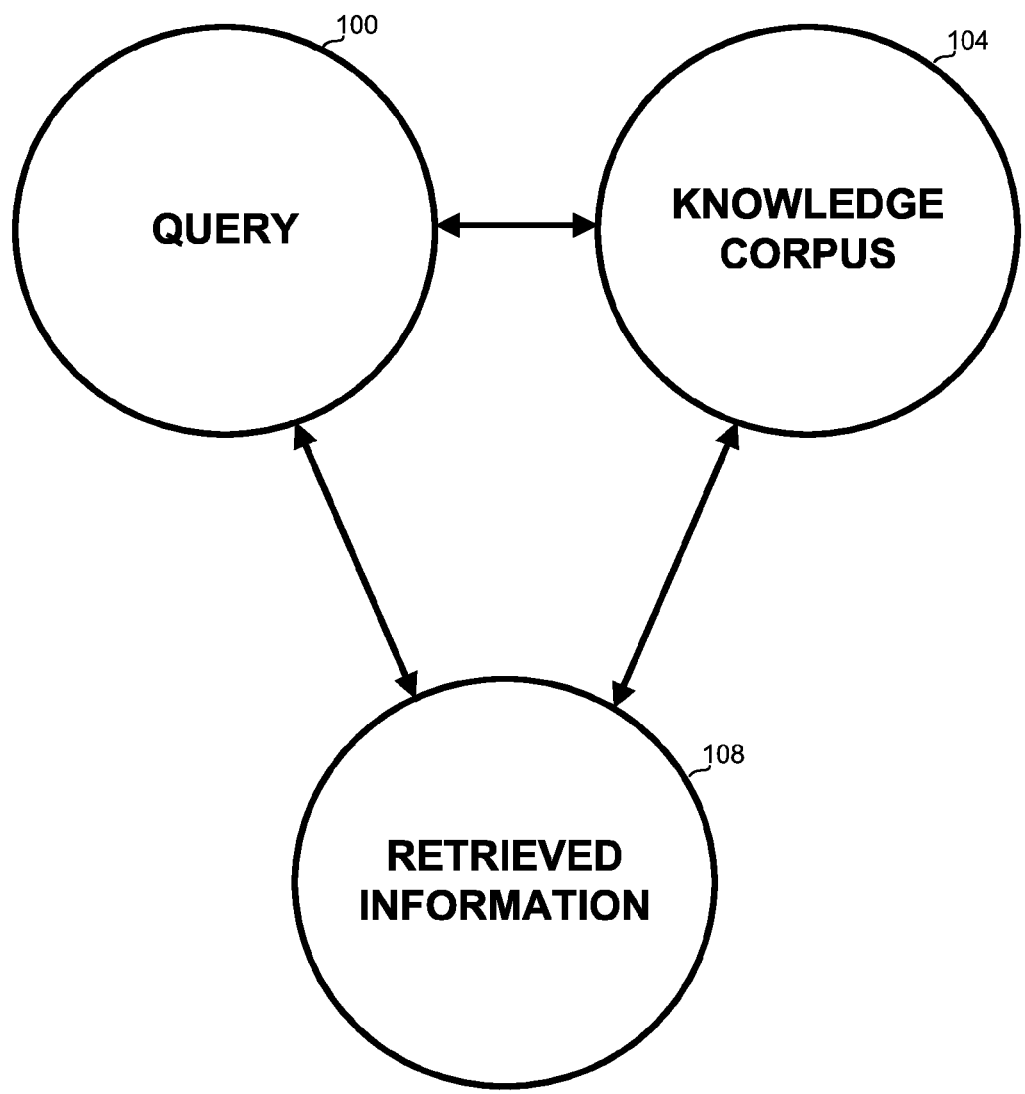
FIG. 1 shows a schematic illustration of the input and output of a method and apparatus for assessing the findability of a query in respect to a corpus, in accordance with some exemplary embodiments of the subject matter.

One technical problem dealt with by the disclosed subject matter is the need to assess the expertise level of a group of professionals.

An early step in any project, whether related to research, development, manufacturing, planning, design, or other stages, is locating a group of experts in the specified field. While locating a single expert regarding a particular subject is usually relatively easy, locating a group of experts is rather challenging, although it is an essential step. Once a group is located, a major factor to be considered when evaluating such a group, is its expertise level. Based upon such determination, it is possible to determine whether further recruiting is needed, whether one or more individuals should be dismissed in order to avoid redundancy in one or more aspects the group, or whether any other change is required.

Assessing the expertise level of a group regarding a subject may also be required for comparing competing groups, for assessing the expertise level of a company or an institute regarding a particular subject, or other purposes.

One technical solution is to use the notion of information findability to address the group expertise challenge.

Findability may be defined as how difficult or easy it is to find information relevant to the query or subject to be explored, or how well a topic, which may be expressed as a query, is covered by a given corpus. For example, Carmel et al. in "What Makes a Query Difficult" published in 2006 in Proceedings of the 29th Annual International ACM SIGIR Conference on Research and Development in Information Retrieval (pp. 390-397), incorporated herein by reference in its entirety, demonstrate the applicability of a difficulty model for some uses, including analyzing the findability of a specific domain. Carmel et al. list three components of a topic, being the textual expression describing the information needed (the query or queries), the set of documents relevant to the topic and the entire collection of documents, and show that topic difficulty strongly depends on the distances between these components.

Some embodiments of the disclosure tie findability to group expertise to address expertise assessment.

A query may first be executed to find a set of the most relevant documents in regard to the topic, out of a given collection. Then, the entities most prominent with respect to the topic may be identified as individuals (or other entities for example institutes or publishers) associated with these documents, such as authors, editors taggers, commenters, or other associated persons. Each entity may be associated with one or more scores indicating its relevancy.

The list of persons or entities may then be filtered to contain only names appearing also in the suggested group of experts, for which it is required to assess their expertise, thus obtaining a filtered list containing entities that were retrieved by the query response and also participate in the group, and one or more scores associated with each entity.

A findability measure of the filtered list may then be assessed in accordance with the assigned scores, thus providing a measure of how well the filtered list covers the topic, which may be regarded as an expertise assessment for the group, as related to the topic.

One technical effect of utilizing the disclosed subject matter is the provisioning of a method and apparatus for assessing the expertise level of a group of individuals. Once such assessment is available, some measurements or actions may be taken.

One such action relates to comparing the expertise level of two or more groups in order to determine which of the groups can better handle a specific task.

Another action my relate to predicting the change in a group's expertise given a new recruit, thus allowing to pick recruits which will enhance the team's expertise in desired topics or aspects.

Yet another action may relate to measuring the predicted change in a group's expertise given a member's departure, in order to assess whether the departing member is redundant and no replacement is required, or to search for a replacement candidate to fill in the gaps such departure may introduce.

Yet another action may relate to measuring an entire division, company, institute, or another unit for its expertise on a given topic, allowing recruiters to better match candidates, or to maintain the public view of a company as an expert in a topic.

Referring now to FIG. 1 showing a schematic illustration of the input and output of a method and apparatus for assessing the findability of a query in respect to a corpus.

The input comprises one or more queries 100, representing one or more aspects of a topic, and a knowledge corpus 104 which may contain information relevant to query 100. Corpus 104 may contain documents, data about entities such as people or organization, structured information such as formulas, tables, or others, or any other piece of information.

The output of executing query 100 against corpus 104 comprises retrieved information 108 which may contain one or more information units such as papers, articles, books, structured information pieces, or the like. Each unit of retrieved information 108 may have a degree of relevance to the query.

As disclosed in Carmel et al. mentioned above, the findability of an aspect represented by the query, e.g. how well the query can be answered, may be determined based on subsets of the distances between query 100, corpus 104 and retrieved information 108, and the inter-distances within corpus 104 and within retrieved information 108. The inter-distances may be imaged as a diameter of a space comprising the relevant entities. If query 100 comprises multiple queries, then the distances between the queries may be used as well.

Figure 2:
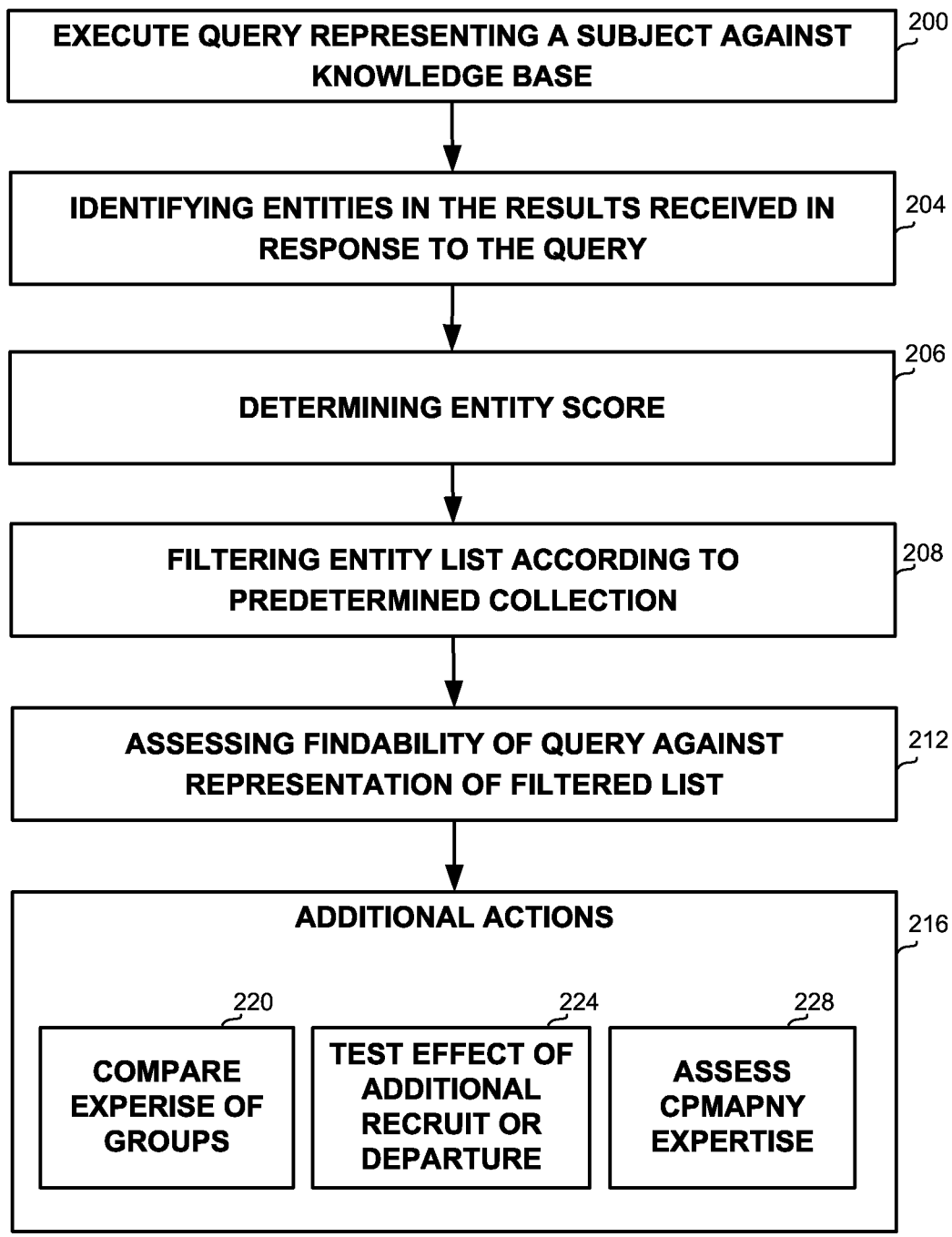
FIG. 2 shows a flowchart diagram of a method for assessing expertise level of a group, in accordance with some exemplary embodiments of the subject matter.

Referring now to FIG. 2 showing a flowchart diagram of a method for assessing the expertise level of a group of people.

On step 200, a query related to the subject for which it is required to assess the expertise may be executed against a given knowledge corpus. The query may be designed or entered by a user such as an expert in the topic, a manager, or the like. The query may be executed using any query engine. The query execution may return a result set, comprising any number of information units which may be relevant to the topic.

On step 204, entities such as individuals associated with each item in the result set returned in response to the query may be identified. For example, the entities may comprise for each unit its author, editor, annotator, tagger, publisher or the like.

On step 206, one or more scores may be associated with each entity. The score may be determined upon: the relationship between the entity and one or more documents, for example an author of a document may receive a higher score than a commenter; a relevancy score associated with the document, also referred to as an evidence of a document, for example an author of a more relevant document will receive a higher score associated with the document than an author of a less relevant document; additional information, such as the number of publications the individual has written; social information such as with how many other relevant individuals the individuals has cooperated, or any other information which may be relevant to assessing the relevancy of the individual to the topic.

On step 208 the list of entities may be filtered to include only entities, and in particular individuals, appearing in the predetermined group, the expertise of which it is required to assess. After step 208 is completed, a list is available comprising entities that appear in the predetermined group, wherein each entity is associated with one or more scores indicating its relevancy to the query. The list may be sorted, for example in accordance with the assigned scores.

It will be appreciated that in some embodiments, the order of steps 204 and 206 may be reversed, such that the list of entities may first be filtered, and then scores may be determined only for the entities on the reduced list.

On step 212, the findability of the list may be assessed according to various measures of the list of names and the associated scores. For example, measures such as standard deviation may be used wherein a larger standard deviation indicates better findability. Additionally or alternatively, other measures indicating distances within the list, which may also be referred to as a "radius" of the group may be used, The determined findability assessment provides an expertise assessment to the group as related to the subject.

On step 216 additional actions may be taken, such as comparing expertise of two groups on step 220, assessing the expertise of the group after additional recruiting or departure of one or more participants on step 224, assessing the expertise of an organization on step 228, or the like. The contribution of one or more team members may be evaluated by comparing the expertise level with and without the team members. Additionally or alternatively, the contribution of team members to specific aspects may be assessed by changing the query and comparing the received expertise level before and after the query change.

Figure 3:
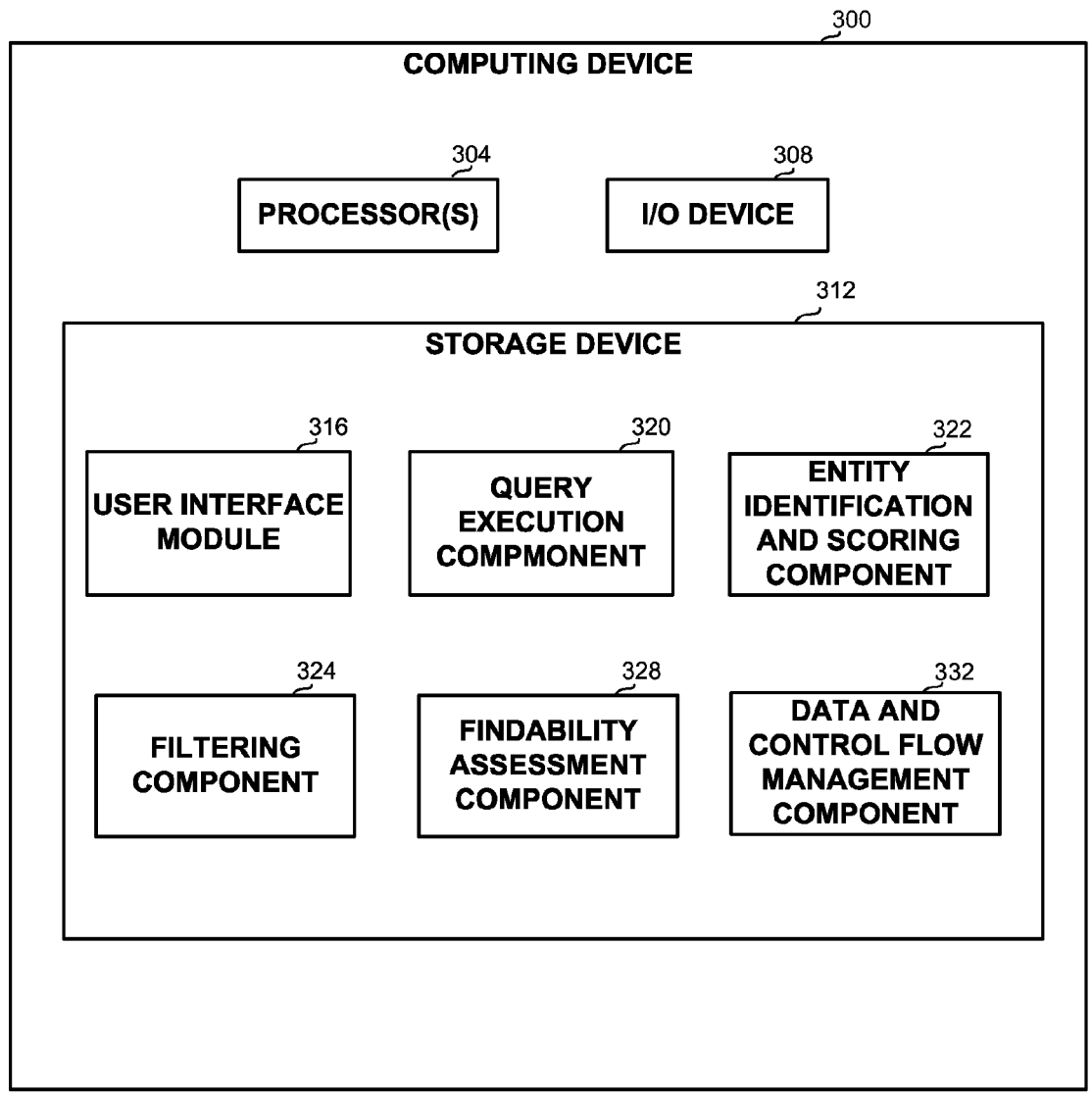
FIG. 3 shows a block diagram of an apparatus for assessing expertise level of a group, in accordance with some exemplary embodiments of the disclosed subject matter.

Referring now to FIG. 3 showing an apparatus 300 configured to assess the expertise level of a group related to a subject, in accordance with some exemplary embodiments of the disclosed subject matter.

In some exemplary embodiments, apparatus 300 may comprise a processor 304. Processor 304 may be a Central Processing Unit (CPU), a microprocessor, an electronic circuit, an Integrated Circuit (IC) or the like. Processor 304 may be utilized to perform computations required by the apparatus 300 or any of it subcomponents.

In some exemplary embodiments of the disclosed subject matter, apparatus 300 may comprise an Input/Output (I/O) device 308 such as a display, a pointing device, a keyboard, a touch screen, or the like. I/O device 308 may be utilized to provide output to and receive input from a user.

In some exemplary embodiments, apparatus 300 may comprise a storage device 312. Storage device 312 may be a hard disk drive, a Flash disk, a Random Access Memory (RAM), a memory chip, or the like. In some exemplary embodiments, storage device 312 may retain program code operative to cause the processor 304 to perform acts associated with any of the subcomponents of apparatus 300. The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 312 may comprise a user interface module 316 for a user to enter information such as one or more queries, group participant names, or any other information or selections, and for displaying information or options to a user, such as expertise level assessment, recommendations as to recruiting or dismissing team members, or the like.

Storage device 312 may also comprise query execution component 320 for executing a query against a knowledge corpus and retrieving documents relevant to the query from the corpus.

Alternatively, storage device 312 may comprise entity identification and scoring component 322 for identifying entities such as persons associated with the retrieved documents, such as an author, commentator, editor, tagger, publisher, or the like. Each entity may be assigned one or more scores indicating its relevancy to the query. The score may be assigned based, for example, on the association of the entity with each document, the score of each such document, or the like. The list may then be ordered based on the score.

Storage device 312 may further comprise filtering component 324 for filtering the obtained entity list such that it contains only names appearing in the provided group.

Storage device 312 may also comprise findability assessment component 328 for evaluating to what extent the list of entities such as individuals, and the associated scores, has expertise on the subject. The assessment may take into account the scores, and mathematical or statistical measures thereof, such as standard deviation.

Storage device 312 may also comprise data and control flow management component 332 for managing the flow of information and control between other components, for example executing query by activating query execution component 320, filtering the results by filtering component 324, activating findability assessment component 328, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   executing a query against a knowledge base to retrieve at least one document;
   retrieving at least one entity associated with the at least one document;
   assigning at least one relevancy score to the at least one entity, the at least one relevancy score representing a degree of relevance of the at least one entity to topic of the query;
   obtaining a filtered list by filtering the at least one entity to contain only entities appearing in a predetermined collection; and
   assessing findability of the query based on the at least one entity and the relevancy score, wherein the findability indicates a degree of difficulty to retrieve information related to the query from the representation of the filtered list.

2. The method of claim 1, wherein the predetermined collection comprises names of individuals.

3. The method of claim 2, wherein the individuals are candidates to participating in a group having expertise in a subject associated with the query.

4. The method of claim 2, wherein the findability represents a level of expertise of a group consisting of the individuals in a subject represented by the query.

5. The method of claim 1, further comprising comparing findability levels of at least two predetermined collections.

6. The method of claim 1, further comprising assessing an effect of removing or adding a name from the predetermined collection.

7. The method of claim 1, wherein the representation comprises at least one item selected from the group consisting of: a rank, an associated field of expertise, a publication, and a lecture.

8. A computerized apparatus having a processor, the processor being adapted to perform the steps of:
   executing a query against a knowledge base to retrieve at least one document;
   retrieving at least one entity associated with the at least one document;
   assigning at least one relevancy score to the at least one entity, the at least one relevancy score representing a degree of relevance of the at least one entity to topic of the query;
   obtaining a filtered list by filtering the at least one entity to contain only entities appearing in a predetermined collection; and
   assessing findability of the query based on the at least one entity and the relevancy score, wherein the findability indicates a degree of difficulty to retrieve information related to the query from the representation of the filtered list.

9. The apparatus of claim 8, wherein the predetermined collection comprises names of individuals.

10. The apparatus of claim 9, wherein the individuals are candidates to participating in a group having expertise in a subject associated with the query.

11. The apparatus of claim 9, wherein the findability represents a level of expertise of a group consisting of the individuals in a subject represented by the query.

12. The apparatus of claim 8, wherein the processor if further adapted to compare findability levels of at least two predetermined collections.

13. The apparatus of claim 8, wherein the processor if further adapted to remove or add a name from the predetermined collection.

14. The apparatus of claim 1, wherein the representation comprises at least one item selected from the group consisting of: a rank, an associated field of expertise, a publication, and a lecture.

15. A computer program product comprising a non-transitory computer readable storage medium retaining program instructions, which program instructions when read by a processor, cause the processor to perform a method comprising:
   executing a query against a knowledge base to retrieve at least one document;
   retrieving at least one entity associated with the at least one document;
   assigning at least one relevancy score to the at least one entity, the at least one relevancy score representing a degree of relevance of the at least one entity to topic of the query;

obtaining a filtered list by filtering the at least one entity to contain only entities appearing in a predetermined collection; and assessing findability of the query based on the at least one entity and the relevancy score, wherein the findability indicates a degree of difficulty to retrieve information related to the query from the representation of the filtered list.

\* \* \* \* \*